(12) United States Patent
Magarill et al.

(10) Patent No.: US 7,821,713 B2
(45) Date of Patent: Oct. 26, 2010

(54) COLOR LIGHT COMBINING SYSTEM FOR OPTICAL PROJECTOR

(75) Inventors: Simon Magarill, Cincinnati, OH (US); David M. Snively, Cincinnati, OH (US)

(73) Assignee: 3M Innovative Properties Company, St. Paul, MN (US)

( * ) Notice: Subject to any disclaimer, the term of this patent is extended or adjusted under 35 U.S.C. 154(b) by 386 days.

(21) Appl. No.: 12/100,577

(22) Filed: Apr. 10, 2008

(65) Prior Publication Data

US 2008/0285129 A1 Nov. 20, 2008

Related U.S. Application Data

(60) Provisional application No. 60/938,834, filed on May 18, 2007.

(51) Int. Cl.
*G02B 27/28* (2006.01)
*G03B 21/14* (2006.01)

(52) U.S. Cl. .......................... 359/495; 353/20; 353/81; 359/496; 359/502

(58) Field of Classification Search ............ 353/20, 353/81, 84, 98; 359/495–502
See application file for complete search history.

(56) References Cited

U.S. PATENT DOCUMENTS

| | | | |
|---|---|---|---|
| 5,625,738 A | 4/1997 | Magarill | |
| 5,882,774 A | 3/1999 | Jonza et al. | |
| 5,962,114 A | 10/1999 | Jonza et al. | |
| 6,336,724 B1 | 1/2002 | Shouji et al. | |
| 6,454,413 B1 * | 9/2002 | Vaan De | 353/20 |
| 6,454,416 B2 | 9/2002 | Aoto et al. | |
| 6,643,077 B2 | 11/2003 | Magarill et al. | |
| 6,721,096 B2 | 4/2004 | Bruzzone et al. | |
| 6,742,897 B1 | 6/2004 | Tajiri | |
| 6,910,777 B2 * | 6/2005 | Ito | 353/31 |
| 7,101,050 B2 | 9/2006 | Magarill et al. | |
| 7,156,520 B2 * | 1/2007 | Chigira et al. | 353/20 |
| 7,204,592 B2 * | 4/2007 | O'Donnell et al. | 353/7 |
| 7,237,899 B2 | 7/2007 | Ma et al. | |
| 7,237,900 B2 * | 7/2007 | Peng et al. | 353/20 |
| 7,429,111 B2 * | 9/2008 | Ockenfuss | 353/20 |
| 7,445,340 B2 * | 11/2008 | Conner et al. | 353/20 |
| 7,452,086 B2 * | 11/2008 | Li | 353/98 |
| 7,652,820 B2 * | 1/2010 | Aastuen et al. | 359/495 |
| 7,686,453 B2 * | 3/2010 | Bruzzone | 353/20 |
| 7,731,366 B2 * | 6/2010 | Aastuen et al. | 353/20 |

(Continued)

OTHER PUBLICATIONS

ColorLink Datasheet, 2003.

(Continued)

*Primary Examiner*—Frank G Font

(57) ABSTRACT

A color light combining system comprises a polarizing beam splitter that includes a reflective polarizer film, a first prism face that receives a first unpolarized color light, a second prism face that receives a second unpolarized color light, and a third prism face that provides a first combined light output that includes combined first color light polarized in a first direction and second color light polarized in a second direction. The polarizing beam splitter includes a reflector at a fourth prism face. A color-selective stacked retardation polarization filter faces the third prism face. The first color selective stacked retardation polarization filter provides a second combined light output that includes the first and second color lights that are combined and have the same polarization direction.

19 Claims, 9 Drawing Sheets

U.S. PATENT DOCUMENTS

| | | |
|---|---|---|
| 2006/0007538 A1 | 1/2006 | Robinson |
| 2006/0028620 A1 | 2/2006 | Conner |
| 2006/0039140 A1 | 2/2006 | Magarill |
| 2006/0209409 A1 | 9/2006 | Li |
| 2006/0221305 A1 | 10/2006 | Magarill |
| 2006/0262282 A1 | 11/2006 | Magarill |
| 2006/0262514 A1 | 11/2006 | Conner et al. |
| 2007/0146639 A1 | 6/2007 | Conner |
| 2007/0291491 A1 | 12/2007 | Li et al. |

OTHER PUBLICATIONS

"Projection TV Chipsets" www.luminus.com/products/chpsets.phl, downloaded May 18, 2007.

"Etendue conserved color mixing" Proc. SPIE vol. 6670 6670E-1.

"A compact LED color mixing scheme with the etendue of a single chip" Proc. Of SPIE vol. 6670 6670D-1.

* cited by examiner

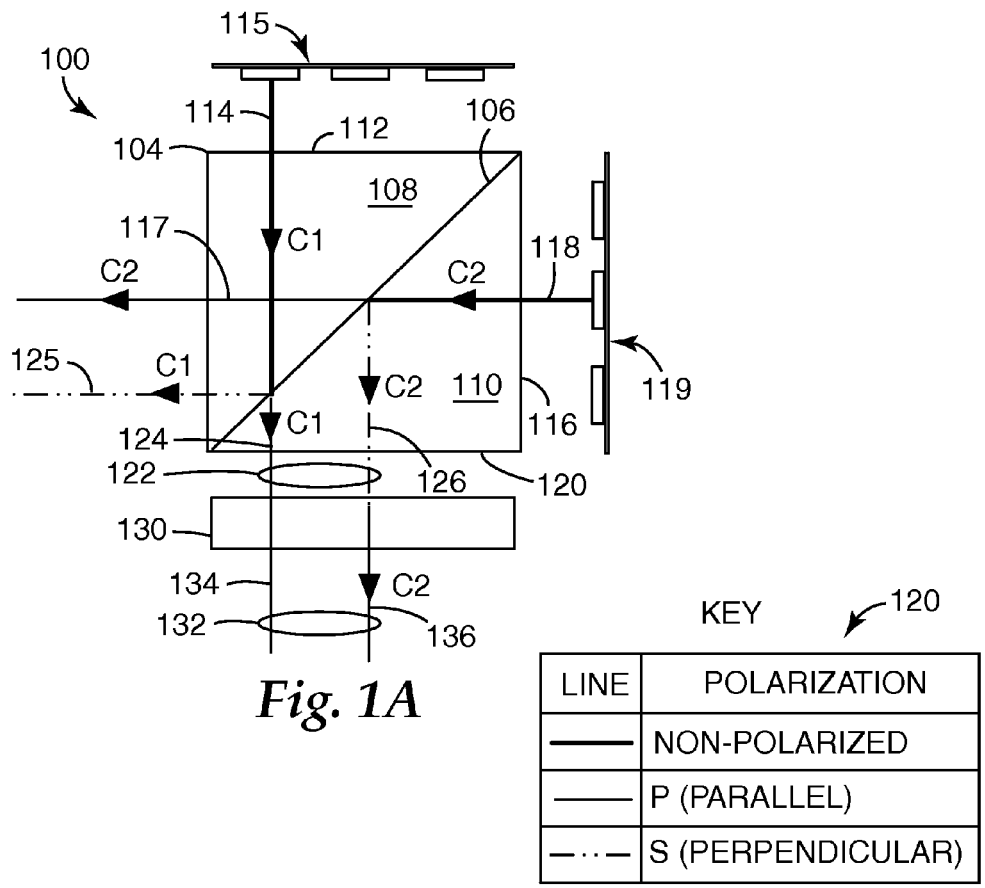
*Fig. 1A*
*Fig. 1B*
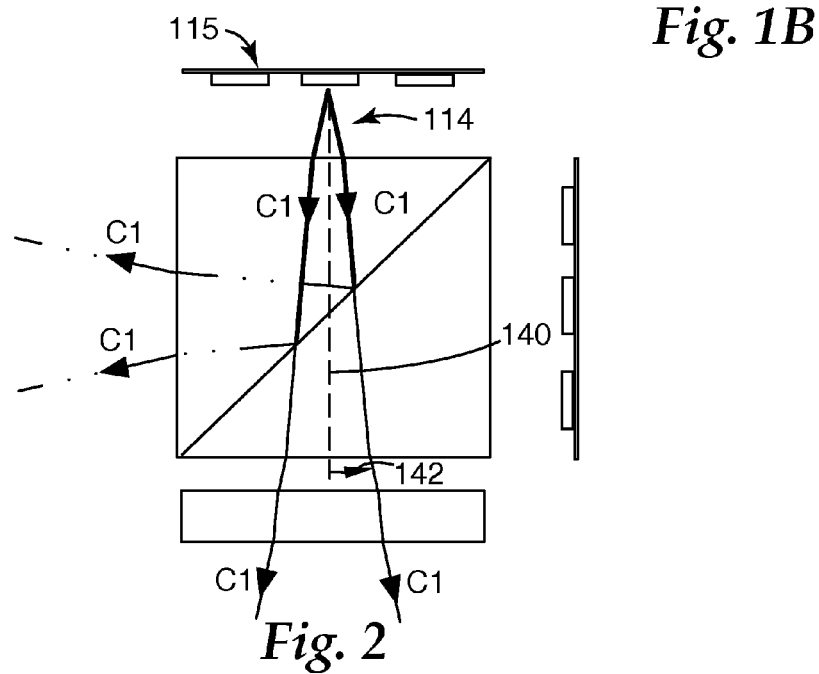
*Fig. 2*

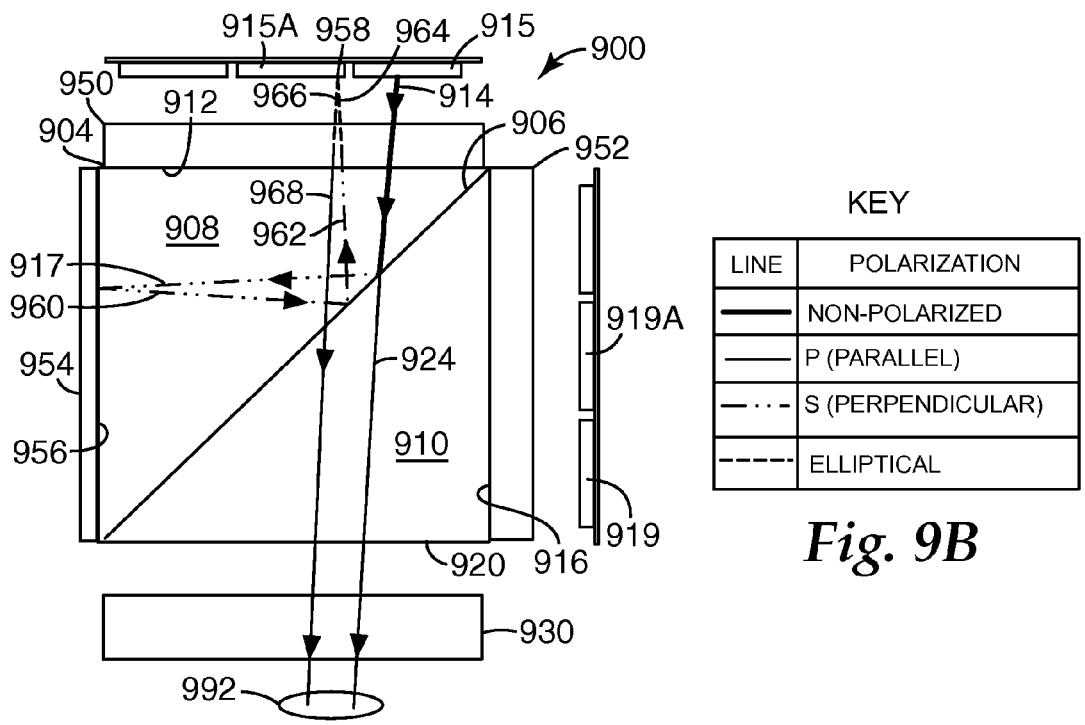
*Fig. 9A*
*Fig. 9B*
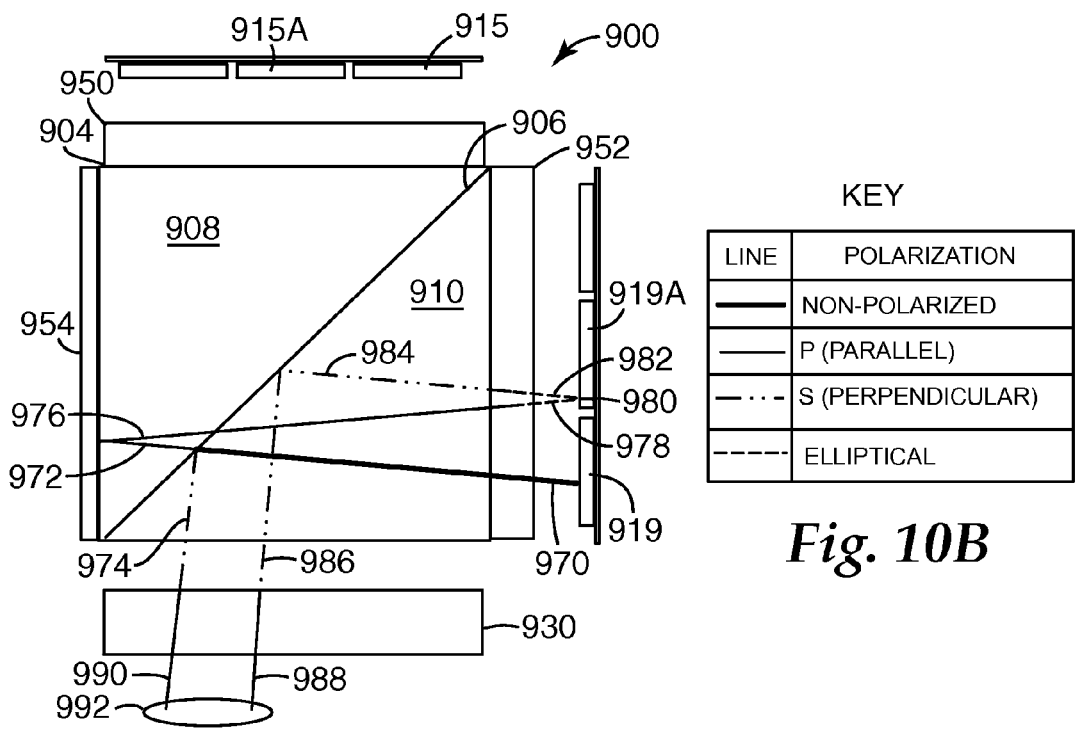
*Fig. 10A*
*Fig. 10B*

COLOR LIGHT COMBINING SYSTEM FOR OPTICAL PROJECTOR

CROSS REFERENCE TO RELATED APPLICATION

This application claims the benefit of U.S. Provisional Patent Application No. 60/938,834, filed May 18, 2007, the disclosure of which is incorporated by reference herein in its entirety.

BACKGROUND

Projection systems used for projecting an image on a screen can use multiple color light sources, such as light emitting diodes (LED's), with different colors to generate the illumination light. Several optical elements are disposed between the LED's and the image display unit to combine and transfer the light from the LED's to the image display unit. The image display unit can use various methods to impose an image on the light. For example, the image display unit may use polarization, as with transmissive or reflective liquid crystal displays.

Image brightness is an important parameter of a projection system. The brightness of color light sources, and the efficiencies of collecting, combining, homogenizing and delivering the light to the image display unit all effect brightness. As the size of modern projector systems decreases, there is a need to maintain an adequate level of output brightness while at the same time keeping heat produced by the color light sources at a low level that can be dissipated in a small projector system. There is a need for a light combining system that combines multiple color lights with increased efficiency to provide a light output with an adequate level of brightness without excessive power consumption by light sources.

SUMMARY

Disclosed is a color light combining system. The color light combining system comprises a polarizing beam splitter. The polarizing beam splitter includes a reflective polarizer film. The polarizing beam splitter includes a first prism face that receives a first unpolarized color light. The polarizing beam splitter includes a second prism face that receives a second unpolarized color light. The polarizing beam splitter includes a third prism face that provides a first combined light output that includes combined p-polarized first color light and s-polarized second color light. The polarizing beam splitter comprises a fourth face with a reflector.

The color light combining system includes a first color-selective stacked retardation polarization filter. The first color-selective stacked retardation polarization filter faces the third prism face. The first color selective stacked retardation polarization filter provides a second combined light output that includes the first and second color lights that are combined and have the same polarization.

According to one aspect, the color light combining system produces white light in a range of about 100 lumens for use in a portable projection system.

The above summary of the present invention is not intended to describe each disclosed embodiment or every implementation of the present invention. The Figures and the detailed description which follow more particularly exemplify illustrative embodiments.

BRIEF DESCRIPTION OF THE DRAWINGS

FIG. 1A illustrates a schematic of an exemplary two color light combining system.

FIG. 1B illustrates a key that identifies polarization of light rays in FIG. 1A.

FIG. 2 illustrates divergent light rays in the color combining system of FIG. 1A.

FIG. 9A illustrates light polarization recycling from a first color light source in the system of FIG. 1A.

FIG. 9B illustrates a key that identifies polarization of light rays in FIG. 9A.

FIG. 10A illustrates light polarization recycling from a second color light source in the system of FIG. 1A.

FIG. 10B illustrates a key that identifies polarization of light rays in FIG. 10A.

DETAILED DESCRIPTION

Figure 3:
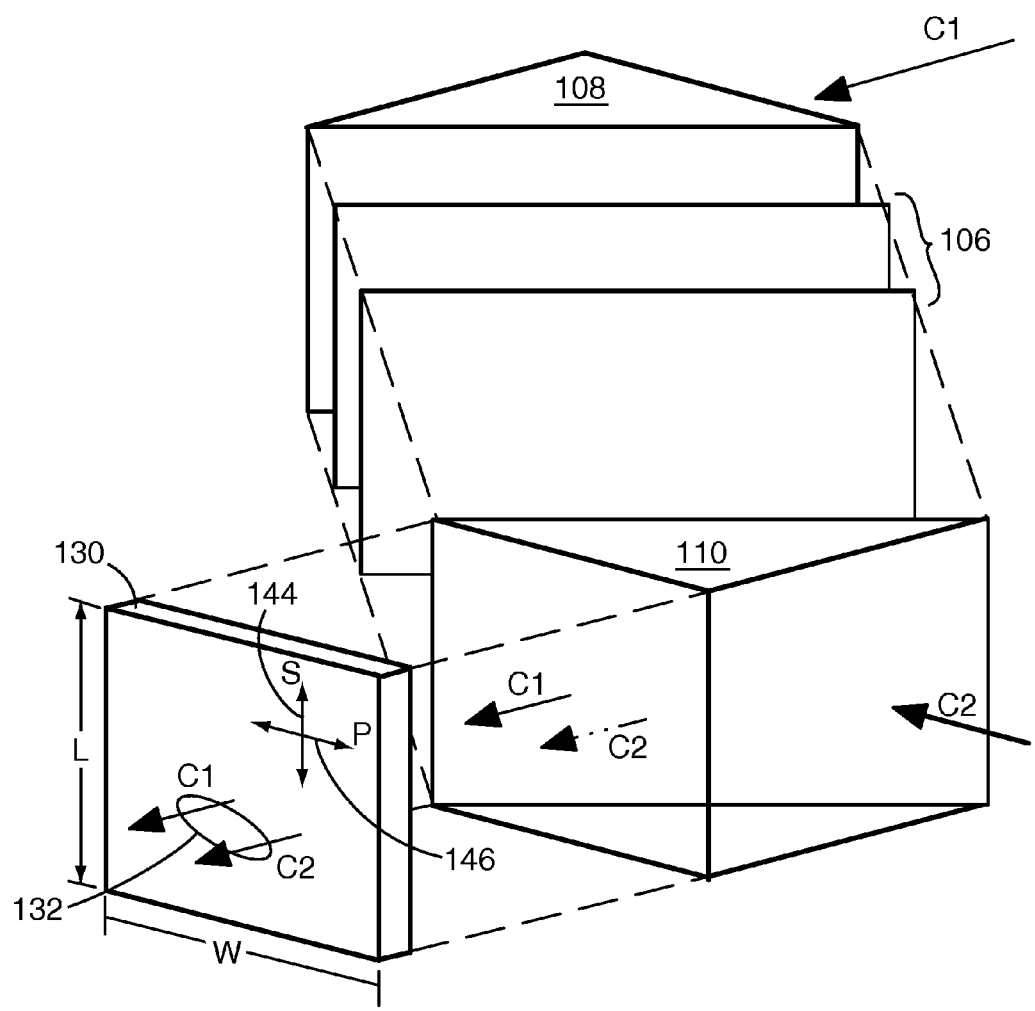
FIG. 3 illustrates an exploded view of the color combining system of FIG. 1A.

In the embodiments described below, a color light combining system receives different color lights and produces a combined light output that is polarized and that includes the different colored lights all polarized the same. Two received color lights are each split according to polarization by a reflective polarizing film in a polarizing beam splitter. According to one aspect, the reflective polarizing film comprises a multi-layer optical film. The polarizing beam splitter produces a first combined light output that combined p-polarized first color light and s-polarized second color light. The first combined light output is passed through a color-selective stacked retardation filter that selectively changes the polarization of the second color light as the second color light passes through the filter. The filter produces a second combined light output that includes the first and second color lights combined to have the same polarization. The second combined output is useful for illumination of transmissive or reflective display mechanisms that modulate polarized light to produce an image.

According to one aspect, two such color light combiners are arranged in cascade to produce white light. A first color light combiner combines a first color light and a second color light to produce a first combined color light. A second color light combiner combines the first combined color light and a third color light to produce a white light.

In one combination, the first color light comprises red light, the second color light comprises blue light and the first color combiner combines the red and blue lights to produce magenta light. In this combination, the second color light combiner combines the magenta light and a green light to produce white light. In another combination, blue and green light are combined in a first color combiner to produce cyan light, and a second color combiner combines the cyan light with red light to produce white light. In yet another combination, red and green light are combined in a first color combiner to produce yellow light, and a second color combiner combines the yellow light with a blue light to produce white light. A combination of colors in any order is contemplated.

According to another aspect, the system includes a colored light source, and the polarizing beam splitter includes a reflector adjacent one face. The colored light source has a surface that is at least partially light reflective. The colored light source is mounted on a substrate that can also be at least partially reflective. The reflector face, the reflective light source, and optionally the reflective substrate cooperate with the polarizing beam splitter to recycle light and improve efficiency. According to yet another aspect, light tunnels can be provided to provide spacing that separate light sources from the polarizing beam splitter. An integrator can be provided to increase uniformity of combined light outputs.

FIG. 1A illustrates a cross-sectional view of light rays in a two color light combining system 100. FIG. 1B illustrates a key 102 that identifies polarization of light rays in FIG. 1A.

The color light combining system 100 comprises a first polarizing beam splitter 104. The polarizing beam splitter 104 comprises prisms 108, 110 and a reflective polarizer film 106 disposed between diagonal faces of the prisms 108, 110. The use of a reflective polarizer film 106 provides the polarizing beam splitter with an ability to pass input light rays that are not fully collimated, and that are divergent or skewed from a central light beam axis. According to one aspect, the reflective polarizer film comprises a multi-layer optical film that comprises multiple films of dielectric material. Use of dielectric films has the advantage of low attenuation of light and high efficiency in passing light. According to another aspect, the multi-layer optical film can comprise multi-layer optical films such as those described in U.S. Pat. No. 5,962,114 Jonza et al. or U.S. Pat. No. 6,721,096 B2 Bruzzone et al., the contents of which are hereby incorporated by reference in this application.

The polarizing beam splitter 104 comprise a first external prism face 112 that receives a first color light 114 that is unpolarized and that has a first color C1. The first colored light 114 is received from a first color light source 115. According to one aspect, the first light source 115 comprises one or more light emitting diodes (LED's). Various light sources can be used such as lasers, laser diodes, organic LED's (OLED's), and non solid state light sources such as ultra high pressure (UHP), halogen or xenon lamps with appropriate collectors or reflectors. The polarizing beam splitter 104 comprises a second external prism face 116 that receive a second unpolarized color light 118 that has a second color C2. The second color C2 has a different color spectrum than the first color C1. The second color light 118 is received from a second color light source 119. According to one aspect, the second color light source 119 comprises one or more LED's. According to one aspect, the first color comprises a red color and the second color comprises a blue color.

The polarizing beam splitter 104 comprises a third prism face 120 that provides a first combined light output 122 that includes combined p-polarized first color light 124 and s-polarized second color light 126.

According to one aspect, the first, second and third prism faces 112, 116, 120 are free, polished external surfaces that are not glued to adjacent optical components. Keeping prism faces 112, 116, 120 free of gluing enhances the total internal reflection properties of the prism faces 112, 116, 120. According to another aspect, all six of the external faces of the polarizing beam splitter 104 (including top and bottom faces) are polished faces that provide total internal reflection (TIR) of oblique light rays within the polarizing beam splitter 104. The total internal reflections provide high efficiency in the polarizing beam splitter 104. At least some light is trapped in the beam splitter 104 by total internal reflections until it leaves through prism face 120.

According to one aspect, the first, second and third prism faces 112, 116, 120 are polished external surfaces that are glued to adjacent optical components. The glue can be an optical adhesive. In one embodiment, the refractive index of the optical adhesive is lower than the refractive index of the prisms. Keeping the refractive index of the optical adhesive lower than the refractive index of the prism retains some total internal reflection properties of the prism faces 112, 116, 120. According to another aspect, all six of the external faces of the polarizing beam splitter 104 (including top and bottom faces) are polished faces that provide total internal reflection (TIR) of oblique light rays within the polarizing beam splitter 104. The total internal reflections provide high efficiency in the polarizing beam splitter 104. At least some light is trapped in the beam splitter 104 by total internal reflections until it leaves through prism face 120.

The reflective polarizer film 106 splits the non-polarized first color light 114 into the p-polarized first color light 124 and an s-polarized first color light 125. The reflective polarizer film 106 splits the non-polarized second color light 118 into a p-polarized second color light 117 and the s-polarized second color light 126. The reflective polarizer film 106 causes the p-polarized first light 124 and the s-polarized second color light 126 to be directed out of prism face 120, thereby combining the light.

It is understood that while exemplary individual light rays are illustrated in the Figures, that colored lights such as 114, 118 spread across substantially all of prism faces 112, 116 respectively. In like manner, the first combined light output 122 spreads across substantially all of the third face 120. It is further understood, that the p-polarization and s-polarization directions are designations of directions that are perpendicular with respect to one another, but otherwise the p and s directions are an arbitrary naming convention. The naming of one direction as a p-polarization and the perpendicular direction as an s-polarization direction can be interchanged. The mutually perpendicular polarization directions can alternatively be described as first and second polarization directions.

The light combining system 100 comprises a first color-selective stacked retardation polarization filter 130. The first color-selective stacked retardation polarization filter 130 faces the third prism face 120 and provides a second combined light output 132 that includes the first and second color lights that are combined and both p-polarized. At the light output 132, the first and second color lights have the same polarization state. The p-polarized first color light 124 passes through the filter 130 without change of polarization, and emerges from the filter 130 as p-polarized first color light 134. The s-polarized second color light 126 passes through the filter 130 with a change of polarization, and emerges from the filter 130 as p-polarized second color light 136. The p-polarized first color light 134 and the p-polarized second color light 164 together comprise the second combined light output 132. Rotation of polarization in the filter 130 is color selective. According to one aspect, the filter 130 comprises a ColorSelect® filter available from ColorLink Incorporated, Boulder, Colo. According to another aspect, the first color light 114 comprises a red light, the second color light 118 comprises a blue light, and the first and second combined light outputs 122, 132 each comprise a magenta light. The magenta light is an additive color combination of the red light and the blue light.

FIG. 2 illustrates divergent light rays in the color combining system 100 of FIG. 1A. The first light source 115 provides a first light 114 that is directional, but somewhat divergent from a central direction axis 140, as illustrated, and is therefore not completely collimated. The reflective polarizer film 106 functions as a polarizing beam splitter for the divergent light rays, and the color combining system 100 combines incompletely collimated light to produce combined light outputs that are also incompletely collimated. According to one aspect, the color light combining system 100 passes received divergent light rays of either the first color, the second color, or both the first and second colors up to a half angle 142 of nearly 90 degrees in the air. According to one aspect, the half angle 142 is at least 80 degrees. According to another aspect, the half angle 142 corresponds to an F number in the range of F2 to F2.8. According to another aspect, the half angle 142 in the range of 12 to 17 degrees.

FIG. 3 illustrates an exploded drawing of the color light combining system 100 shown in FIG. 1A. As illustrated in FIG. 3, a width W and a thickness L of the prisms 108, 110 and the filter 130 can be chosen to provide a desired aspect ratio L/W that is compatible with a projection system. As illustrated in FIG. 3, a second combined light output 132 comprises p-polarized light that is approximately aligned with a P-axis 146 of polarization. An s-axis 144 of polarization is perpendicular to the p-axis 146.

Figure 4:
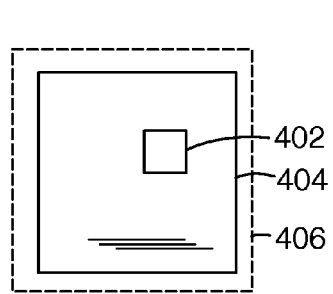
FIG. 4 illustrates a schematic of an exemplary light source that is reflective.

FIG. 4 illustrates a light source 402 mounted on a substrate 404. An emitting surface of the light source 402 is at least partially reflective to reflect color light. The emitting surface is aligned with a light input face 406 (such as prism face 112 or 116 in FIG. 1A). According to one aspect, the light source 402 comprises an LED. According to another aspect, the substrate 404 is at least partially reflective to reflect color light.

Figure 5:
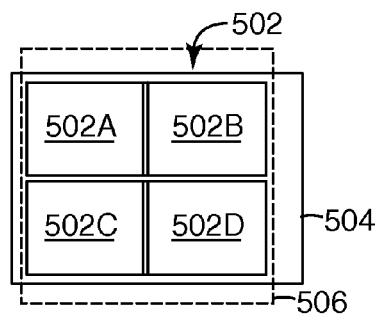
FIG. 5 illustrates a schematic of an exemplary light source comprising multiple LED's that are reflective.

FIG. 5 illustrates a light source 502. The light source 502 comprises multiple LED's 502A, 502B, 502C, 502D with at least partially reflecting emitting surfaces. The light source 502 is mounted on a substrate 504 which is at least partially reflective. The emitting surfaces are aligned with a light input face 506.

Figure 6:
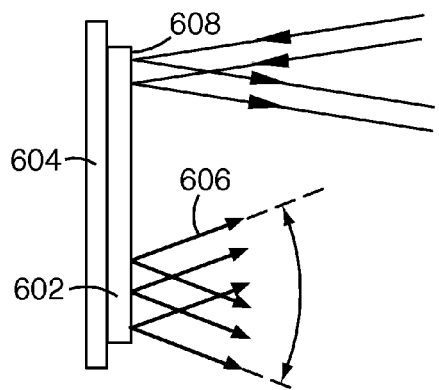
FIG. 6 illustrates a schematic of light rays emitted from a light source and specular reflected light rays.

FIG. 6 illustrates a side view of a light source 602 mounted on a substrate 604. The light source 602 produces colored light 606 that is directional, but not fully collimated. The emitting surface of the light source 602 is at least partially reflective to reflect light in a specular fashion.

Figure 7:
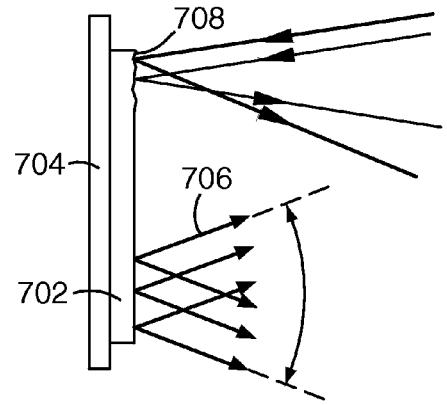
FIG. 7 illustrates a schematic of light rays emitted from a light source and non-specular reflected light rays.

FIG. 7 illustrates a side view of a light source 702 mounted on a substrate 704. The light source 702 produces colored light 706 that is directional, but not fully collimated. The emitting surface of the light source 702 is at least partially reflective to reflect colored light in a non specular fashion.

Figure 8:
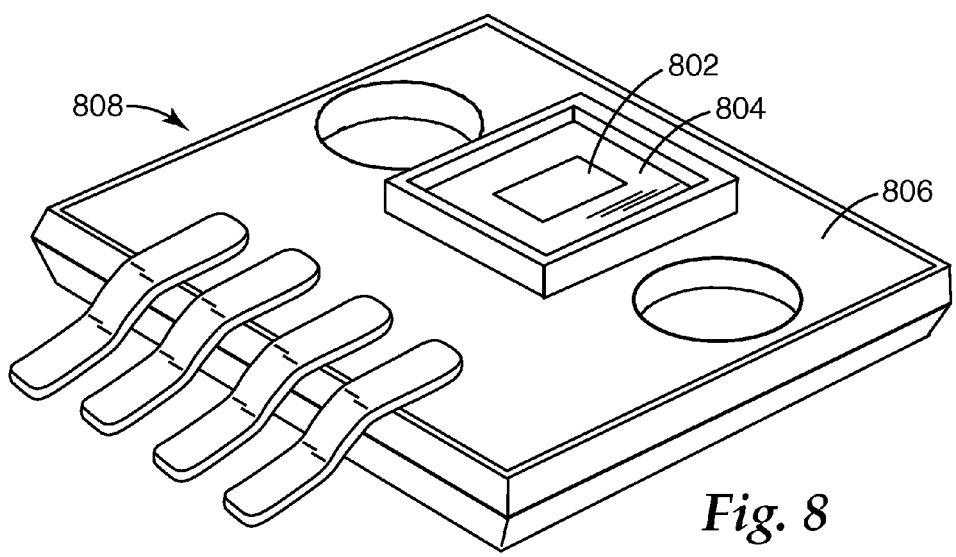
FIG. 8 illustrates a schematic of an exemplary LED light source on a support plate.

FIG. 8 illustrates an oblique view of a light source 802 mounted on a reflective substrate 804. According to one aspect, the reflective substrate 804 is mounted to a mounting plate 806 to form an assembly 808. According to another aspect, the light source 802 is at least partially reflective. According to yet another aspect, the assembly 808 comprises a PhlatLight™ device available from Luminus Devices, Inc. of Woburn, Mass.

FIG. 9A illustrates polarization recycling from a first color light source 915 in a color light combining system 900. FIG. 9B illustrates a key that identifies polarization of light rays in FIG. 9A. The color light combining system 900 is arranged similar to the light combining system 100 and also includes additional components that cooperate to provide polarization recycling. The color light combining system 900 comprises a first polarizing beam splitter 904. The beam splitter 904 comprises prisms 908, 910 and a reflective polarizer film 906 disposed between diagonal faces of the prisms 908, 910. The light combining system 900 comprises a first color-selective stacked retardation polarization filter 930.

The color light combining system 900 comprises a first quarter-wavelength plate 950 disposed adjacent a first prism face 912. The color light combining system 900 comprises a second quarter-wavelength plate 952 disposed adjacent a second prism face 916. The color light combining system 900 comprises a reflector (mirrored surface) 954. According to one aspect, the reflector 954 comprises silver or another highly reflective coating on external prism face 956 of the polarizing beam splitter 904. According to another aspect, the reflector 954 comprises a mirror that is disposed adjacent the prism face 956 The reflector 954, a reflective emitting surface, and the quarter-wavelength plates 950, 952 cooperate to recycle light from the first color light source 915 and the second color light source 919.

A first unpolarized color light 914 is received from the first color light source 915. The unpolarized color light 914 passes through the first quarter-wavelength plate 950 without a change in polarization. The unpolarized color light 914 is split (separated) by the reflective polarizer film 906 into a p-polarized color light 924 (comparable to p-polarized light 124 in FIG. 1A) and an s-polarized light 917 (comparable to s-polarized light 117 in FIG. 1A). The s-polarized light 917 reflects from the reflector 954 to produce s-polarized light 960. The s-polarized light 960 reflects from the reflective polarizer film 906 to produce s-polarized light 962. The s-polarized light 962 passes through the first quarter-wavelength plate 950 with a slow axis oriented at 45 degrees to a polarization direction of the polarizing beam splitter 904, then reflects from the partially reflecting emitting surface of the light source 915A and passes through quarter wave plate 950 a second time. The s-polarized light 962 after the double pass through the quarter wave plate 950 (with a slow axis at 45 degrees to a polarization direction of the polarizing beam splitter 904) becomes p-polarized. The p-polarized light 968 passes through the reflective polarizer film 906 and the filter 930. The s-polarized light 917 is thus recycled into p-polarized light 968. The p-polarized light 968 combines with the p-polarized light 924 to increase light output from the light combining system.

FIG. 10A illustrates light recycling from the second color light source 919 in the color light combining system 900 (FIG. 9A). FIG. 10B illustrates a key that identifies polarization of light rays in FIG. 10A. Reference numbers in FIG. 10A that are the same as reference number used in FIG. 9A identify the same parts.

A second unpolarized color light 970 is received from the second color light source 919. The second unpolarized color light 970 passes through the second quarter-wavelength plate 952. The unpolarized color light 970 is split (separated) by the reflective polarizer film 906 into a p-polarized second color light 972 (comparable to p-polarized light 117 in FIG. 1A) and an s-polarized light 974 (comparable to s-polarized light 126 in FIG. 1A). The p-polarized light 972 reflects from the reflector 954 to produce p-polarized light 976. The s-polarized light 974 reflects from the reflective polarizer film 906. The p-polarized light 976 passes through the second quarter-wavelength plate 952 oriented at 45 degrees to a polarization direction of the polarizing beam splitter 904 and is then reflected from a reflecting emitting surface of an emitting surface of source 919A and passes through the second quarter wave plate 952 a second time. This changes the polarization state of the light orthogonally and the light 984 has S-polarization. The s-polarized light 984 reflects from the reflective polarizer film 906 to produce s-polarized light 986. The p-polarized light 972 is thus recycled into s-polarized light 986. The s-polarized light 986 combines with the s-polarized light 974 to increase light output from the light combining system. 900. The color filter 930 receives the s-polarized lights 986, 974 and produces p-polarized light 988, 990.

A second combined output 992 of the color light combining system 900 illustrated in FIGS. 9A, 10A thus includes first color light 924, first color recycled light 968, second color light 990 and second color recycled light 988, all polarized in the same direction. The light recycling as illustrated in FIGS. 9A, 10A produces additional light output without increasing light input. The light recycling improves efficiency of the color light combining system.

Figure 11:
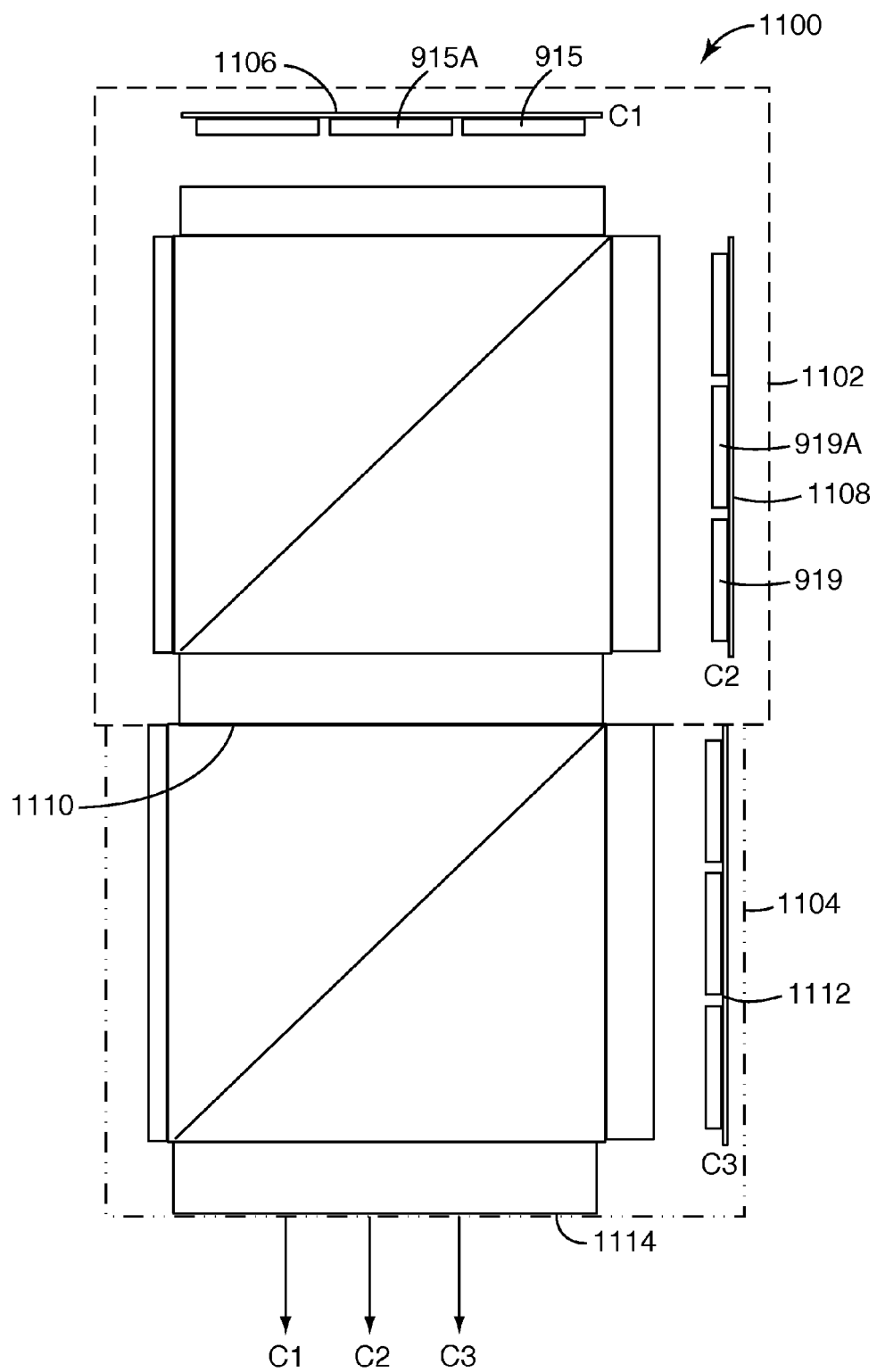
FIG. 11 illustrates a schematic of an exemplary three color light combining system.

FIG. 11 illustrates a cross-sectional view of a three color light combining system 1100. The three color light combining system 1100 comprises a first two color light combining system 1102. According to one aspect, the two color light combining system 1102 is arranged as illustrated in FIGS. 9A, 10A. The three color light combining system 1100 comprises a second two color light combining system 1104. According to one aspect of the invention, the second two color light combining system 1104 is arranged as illustrated in FIGS. 9A, 10A, except that the second two color light combining system 1104 does not include a quarter wavelength filter such as quarter wavelength filter 950 (FIGS. 9A, 10A) on the surface receiving light from the first two color combining system.

According to one aspect, the first two color light combining system 1102 combines a first color red light C1 from a red light source 1106 and a second color blue light C2 from a blue light source 1108. The first two color light combining system 1102 provides a combined light output at output face 1110 that comprises magenta light. According to another aspect, the second two color light combining system 104 combines the magenta light at output face 1110 with green light C3 from a green light source 1112. The second two color combining system 104 combines the magenta light at output face 1110 and the green light from light source 1112 to produce light at output face 1114 that has a color (such as approximately 8500 degree K color temperature) in the range of white colors that is useful for projection. Adjustment to other white colors is also contemplated.

Figure 12:
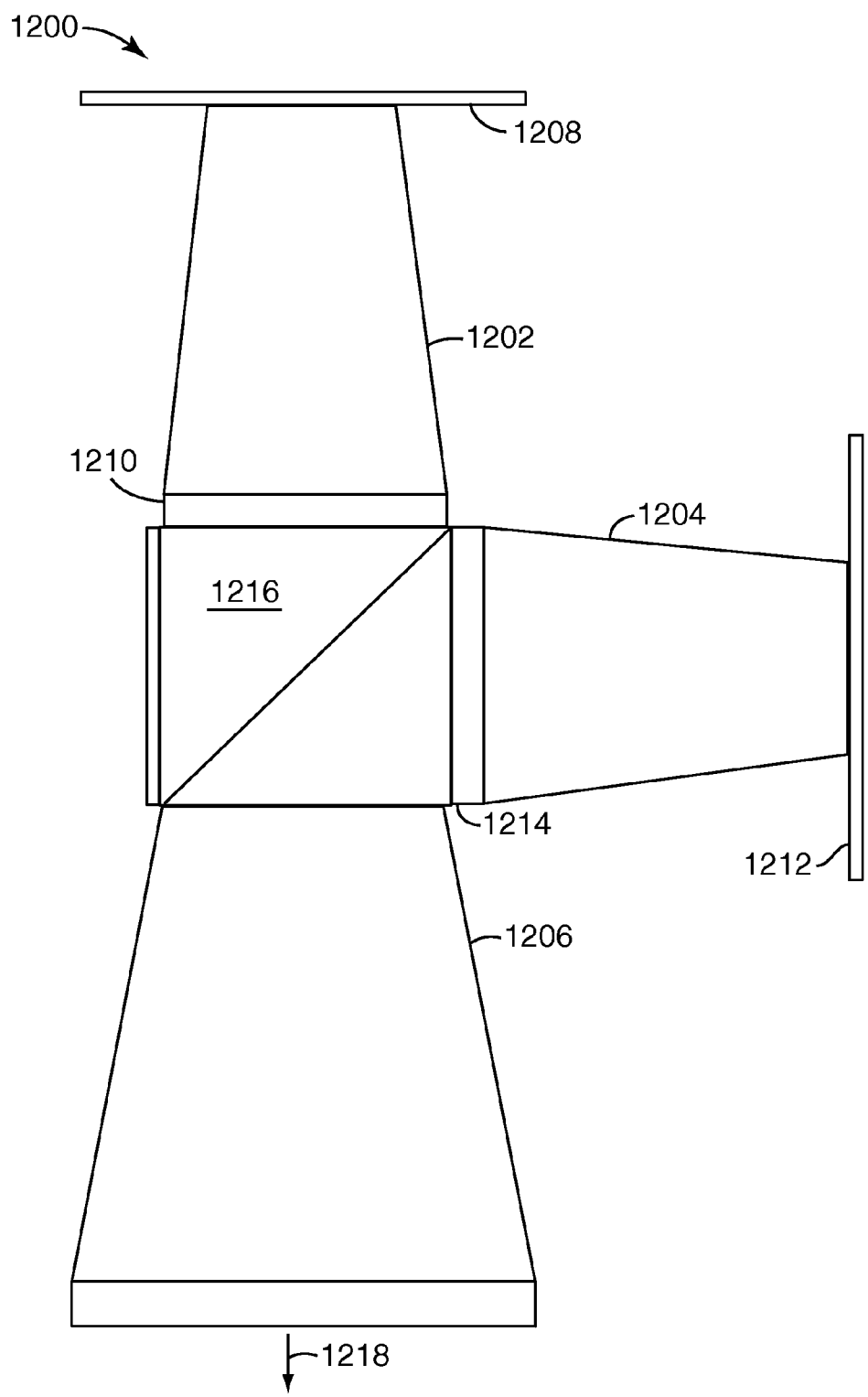
FIG. 12 illustrates a schematic of an exemplary two color light combining system that includes light tunnels.

FIG. 12 illustrates a two color light combining system 1200. The two color light combining system 1200 is similar to the two color light combining system 900 illustrated in FIGS. 9A, 10A, except that the two color light combining system 1200 additionally comprises first and second light pipes 1202, 1204 and a light integrator 1206. The first light pipe 1202 is disposed between a first light source 1208 and a first quarter-wavelength plate 1210. The second light pipe 1204 is disposed between a second light source 1212 and a second quarter-wavelength plate 1214. The light pipes 1202, 1204 avoid mechanical interferences between the light sources and the polarizing beam splitter 1216. The light integrator 1206 increases the uniformity of a combined light output 1218. According to one aspect, the quarter wave plates 1210, 1214 are placed between the respective light pipes 1202, 1204 and the polarizing beam splitter 1216. According to another aspect the relative positions of the light pipes 1202, 1204 and the quarter wave plates 1210, 1214 are reversed such that the quarter wave plates 1210, 1214 are placed between the respective light pipes 1202, 1204 and the respective light sources 1208, 1212.

Figure 13:
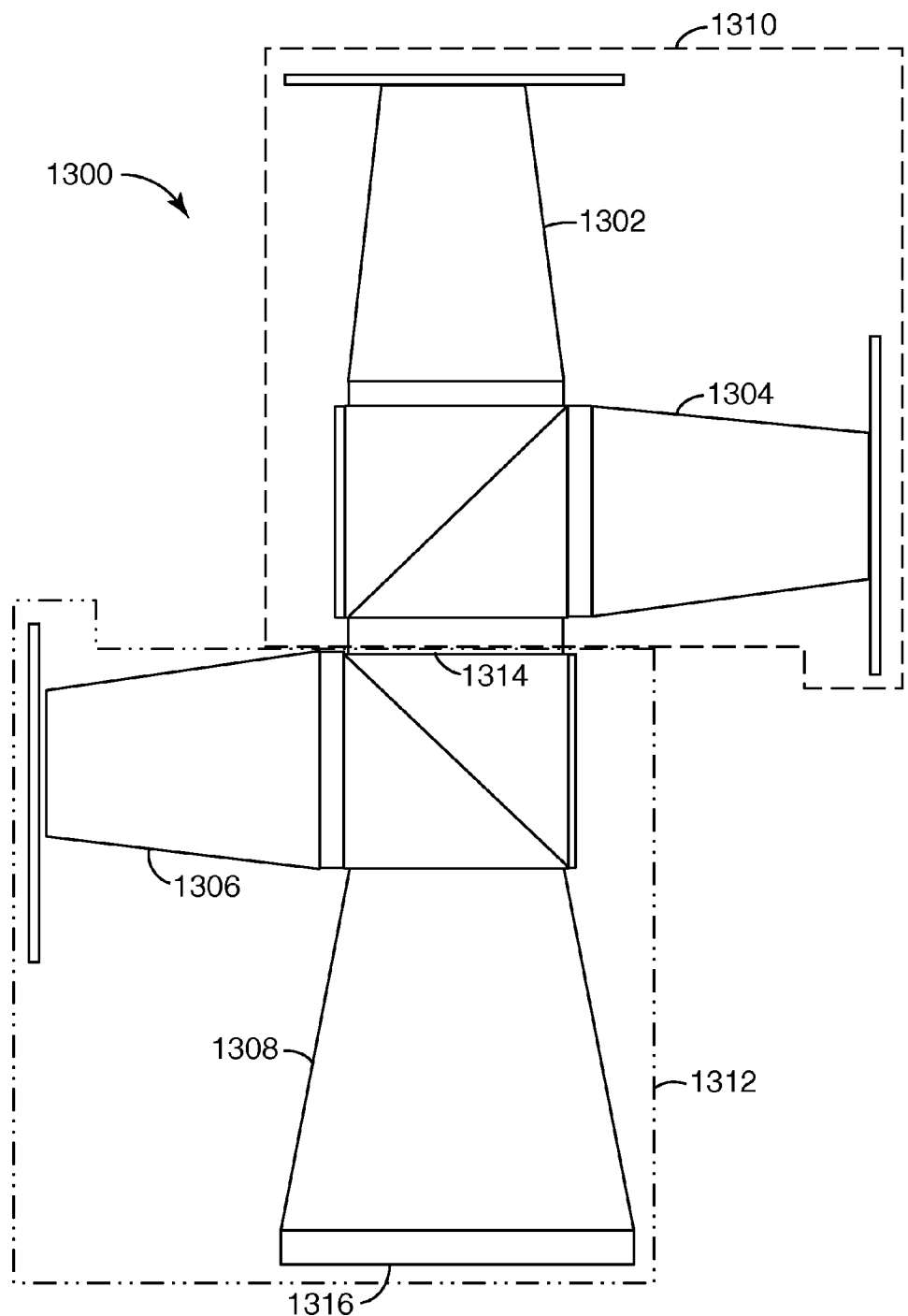
FIG. 13 illustrates a schematic of an exemplary three color light combining system that includes light tunnels.

FIG. 13 illustrates a three color light combining system 1300. The three color light combining system 1300 is similar to the three color light combining system 1100 in FIG. 11, except that the three color light combining system 1300 includes first, second and third light pipes 1302, 1304, 1306 and a light integrator 1308. The three color light combining system 1300 comprises a first two color light combining system 1310 that is similar to the two color light combining system 1200 in FIG. 12. The three color light combining system 1300 comprises a second two color light combining system 1312 that receives a combined two color light output at face 1314 from the first two color light combining system 1310. The second two color light combining system combines the two color light output at face 1314 with a third color, and provides a combined three color light output at face 1316. According to one aspect, the color light combining system produces white light in a range of about 100 lumens for use in a portable projection system.

Figure 14:
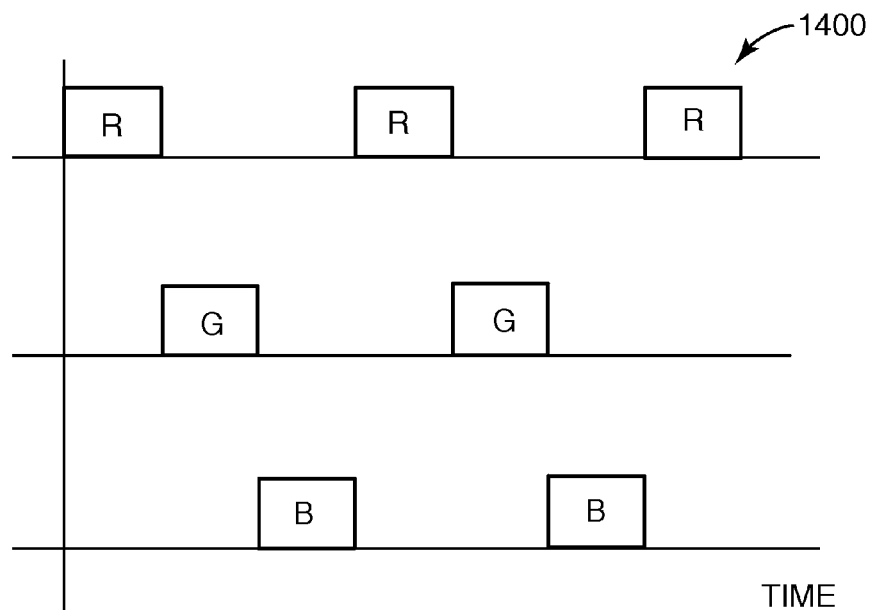
FIG. 14 illustrates an exemplary timing diagram of sequenced energization of first, second and third color light sources.

FIG. 14 illustrates an exemplary time sequence 1400 of energization of three color light sources, red (R), green (G), and blue (B). Light sources in a three color light combining system can be energized sequentially as illustrated. According to one aspect, the time sequence is synchronized with a transmissive or reflective imaging device in a projection system that receives a combined light output from the three color light combining system. According to one aspect, the time sequence is repeated at rate that is fast enough so that an appearance of flickering of projected image is avoided, and appearances of motion artifacts such as color break up in a projected video image are avoided.

Figure 15:
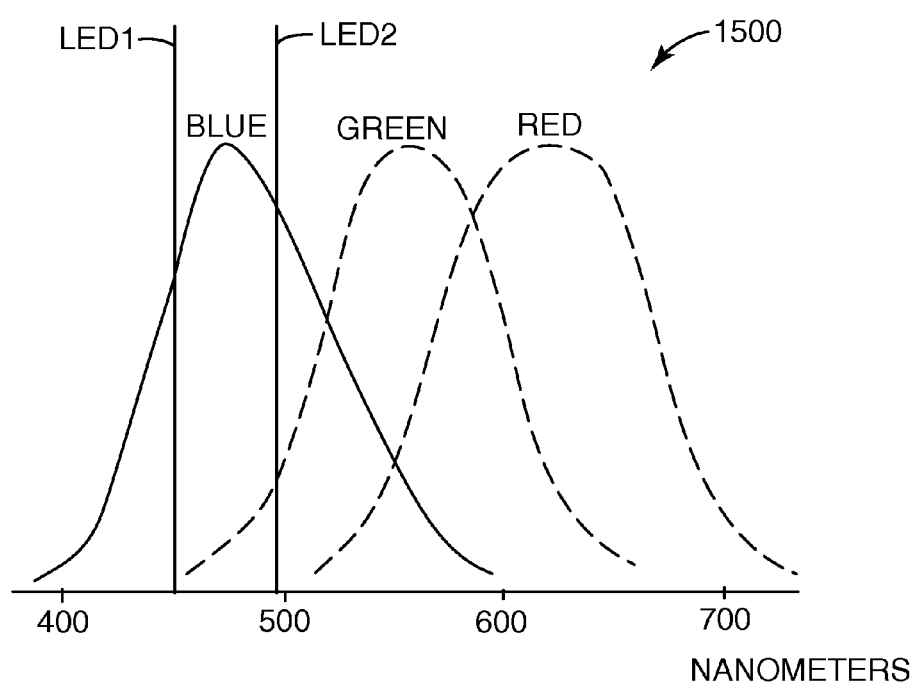
FIG. 15 illustrates use of two LED's with differing spectra as a color light source.

FIG. 15 illustrates a graph of human visual perception of red, blue and green as a function of wavelength of monochrome light. As illustrated, a first LED (LED1) produces light at a first wavelength in the blue range, and a second LED (LED2) produces light at a second wavelength, different than the first wavelength, that is also in the blue range. The LED's with different wavelengths can be combined in a single light source such as the light source described above in connection with FIG. 5. Use of different wavelengths in a light source can reduce power consumption by increasing perceived brightness of the color produced. Multiple spectra LEDS can be used in one or more of the red, blue or green ranges.

Thus, by combining light from multiple LED's with different wavelengths that are generally in the range of one of the visually perceived visual colors, but that are not exactly at the desired peak wavelength for that one perceived visual color, the perceived brightness of that color can be enhanced without a corresponding increase in electrical power. Perception of the color purity of the white light produced in combination with other color lights is also enhanced.

Figure 16:
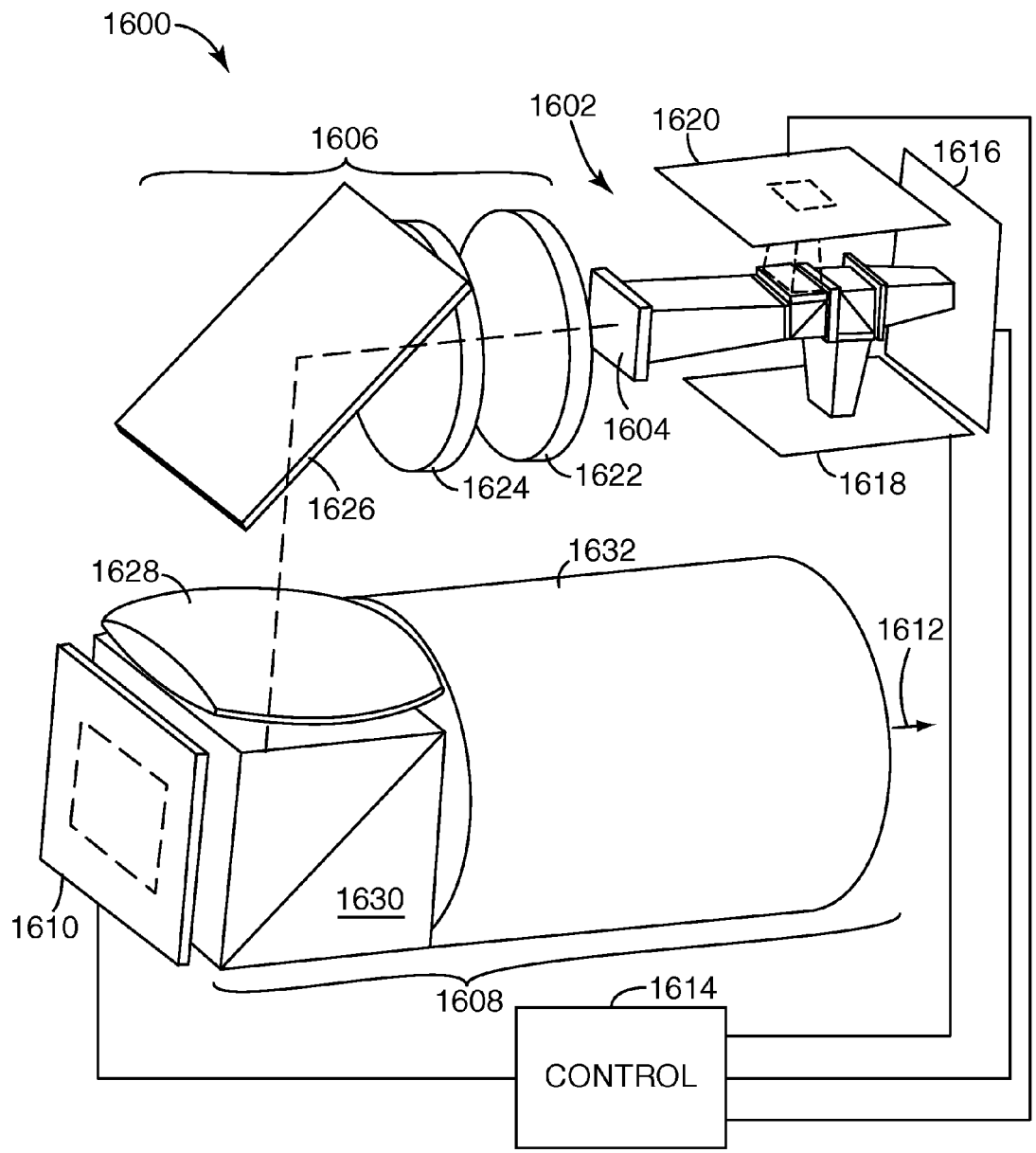
FIG. 16 illustrates a schematic of an exemplary three color light combining system providing a combined three color light output to an image projection system.

FIG. 16 illustrates a projector 1600 that includes a three color light combining system 1602. The three color light combining system 1602 provides a combined light output at 1604 that is polarized. The combined light output at 1604 passes through light engine optics 1606 to projector optics 1608.

The light engine optics 1606 comprise lenses 1622, 1624 and a reflector 1626. The projector optics 1608 comprise a lens 1628, a beam splitter 1630 and projection lenses 1632. One or more of the projection lenses 1632 can be movable relative to the beam splitter 1630 to provide focus adjustment for a projected image 1612. A reflective imaging device 1610 modulates the light in the projector optics to produce the projected image 1612. A control circuit 1614 is coupled to the reflective imaging device 1610 and to light sources 1616, 1618 and 1620 to synchronize the operation of the reflective imaging device 1610 with sequencing of the light sources 1616, 1618 and 1620. The arrangement illustrated in FIG. 16 is exemplary, and the light combining systems disclosed can be used with other projection systems as well. According to one alternative aspect, a transmissive imaging device can be used.

According to one aspect, a color light combining system as described above produces a three color (white) output. The system has high efficiency because polarization properties (reflection for S-polarized light and transmission for P-polarized light) of a polarizing beam splitter with reflective polarizer film have low sensitivity for a wide range of angles of incidence of source light. Additional collimation components can be used to improve collimation of the light from light sources before application to dichroic filters in the polarizing beam splitter. Without a certain degree of collimation, there will be significant light losses associated with variation of dichroic reflectivity as a function of angle of incidence (AOI). In the present disclosure, polarizing beam splitters function as light pipes to keep light contained by total internal reflection, and released only through desired surfaces.

Although the present invention has been described with reference to preferred embodiments, workers skilled in the art will recognize that changes may be made in form and detail without departing from the spirit and scope of the invention.

What is claimed is:

1. A color light combining system, comprising:
   a first polarizing beam splitter that includes a reflective polarizer film and that includes first and second prism faces that receive first and second unpolarized color lights, respectively, and that includes a third prism face that provides a first combined light output that includes combined first color light polarized in a first polarization direction and second color light polarized in a second direction, and that includes a fourth prism face with a reflector that provides light recycling; and
   a first color-selective stacked retardation polarization filter that faces the third prism face and that provides a second combined light output that includes the first and second color lights that are combined and have the same polarization direction.

2. The color light combining system of claim 1 wherein the received first and second unpolarized color lights comprise input lights rays ranging from divergent to converged, and the second combined light output comprises output light rays ranging from divergent to converged.

3. The color light combining system of claim 2 wherein the color light combining system passes received light rays at angles up to a half angle of at least 90 degrees in air.

4. The color light combining system of claim 1, comprising:
   a first color light source that provides the first unpolarized color light;
   a first light source with an emitting surface that is at least partially reflective;
   a quarter-wavelength plate disposed between the first light source and the first prism face; and
   wherein the reflector, the reflective emitting surface, and the quarter-wavelength plate cooperate to recycle light from the first source.

5. The color light combining system of claim 1, comprising:
   a first color light sources that provides the first unpolarized color light; and
   a first light pipe disposed between the first color light source and the first prism face.

6. The color light combining system of claim 1, comprising:
   a light integrator disposed between the third prism face and the first color-selective stacked retardation polarization filter.

7. The color light combining system of claim 1 wherein in at least one of the colored lights is generated by a color light source that includes a first LED with a first color spectrum, and a second LED with a second color spectrum different than the first color spectrum, the first and second color spectra being within a perceived color range.

8. The color light combining system of claim 1, comprising:
   a second polarizing beam splitter that includes a reflective polarizer film and that includes a fourth prism face that receives the second combined light output and a fifth prism face that receives a third unpolarized color light, and that includes a sixth prism face that provides a third combined light output that provides the second combined light output with a first defined polarization state combined with a third color light output with an orthogonal polarization state; and
   a second color-selective stacked retardation polarization filter that faces the sixth prism face and that provides a fourth combined light output that combines the first, second and third color lights with the same polarization state.

9. The color light combining system of claim 8, comprising:
   a first light integrator disposed between the third prism face and the second color-selective stacked retardation filter.

10. The color light combining system of claim 8 wherein the fourth combined light output provides first, second and third color lights in a time sequence.

11. The color light combining system of claim 8 wherein the combined light output provides red, green and blue colored lights.

12. The color light combining system of claim 8 wherein the second combined light output provides first and second color lights in a time sequence.

13. The color light combining system of claim 8 and further comprising an optical projection system that receives the fourth combined light output.

14. The color light combining system of claim 1 wherein each of the external faces of the first polarizing beam splitter is polished.

15. The color light combining system of claim 14 wherein the first, second and third prism faces are free external surfaces that are not glued to adjacent optical components.

16. The color light combining system of claim 14 wherein the first, second and third prism faces are glued to adjacent optical components with an optical adhesive.

17. The color light combining system of claim 16 wherein the index of refraction of the optical adhesive is less than the index of refraction of the prisms.

18. A color light combining system, comprising:
   a first beam splitter that includes reflective polarizer film disposed between internal surfaces of the beam splitter, and that receives first and second unpolarized color lights and that provides a first combined light output that includes p-polarized first color light and s-polarized second color light;

a first color-selective stacked retardation polarization filter that receives the first combined light output and that provides a second combined light output that includes the first and second color lights that are polarized with the same polarization direction;

first and second color light sources that provide the first and second unpolarized color lights, respectively;

first and second reflective substrates adjacent the first and second light sources, respectively;

first and second quarter-wavelength plates disposed between the first and second reflective substrates and the first beam splitter; and a reflector disposed on the first beam splitter, wherein the reflector, the reflective substrate surfaces, and the quarter-wavelength plates cooperate to recycle light from the first and second light sources.

19. The color light combining system of claim 18 and further comprising an optical projection system that receives the second combined light output.

* * * * *